US011710839B2

(12) United States Patent
Murai et al.

(10) Patent No.: US 11,710,839 B2
(45) Date of Patent: Jul. 25, 2023

(54) CONTROLLER, CONTROLLING METHOD, AND RECORD MEDIUM

(71) Applicant: TOSHIBA ENERGY SYSTEMS & SOLUTIONS CORPORATION, Kawasaki (JP)

(72) Inventors: Masahiko Murai, Tokyo (JP); Shingo Tamaru, Kanagawa (JP); Takashi Akiba, Kanagawa (JP); Fumiyuki Yamane, Kanagawa (JP); Shin Kato, Kanagawa (JP); Hirofumi Morita, Kanagawa (JP); Tetsuharu Tanoue, Tokyo (JP)

(73) Assignee: Toshiba Energy Systems & Solutions Corporation, Kawasaki Kanagawa (JP)

( * ) Notice: Subject to any disclaimer, the term of this patent is extended or adjusted under 35 U.S.C. 154(b) by 218 days.

(21) Appl. No.: 17/344,879

(22) Filed: Jun. 10, 2021

(65) Prior Publication Data
US 2021/0305606 A1 Sep. 30, 2021

Related U.S. Application Data

(63) Continuation of application No. PCT/JP2018/045680, filed on Dec. 12, 2018.

(51) Int. Cl.
*H01M 8/06* (2016.01)
*H01M 8/0612* (2016.01)
(Continued)

(52) U.S. Cl.
CPC ........... *H01M 8/0631* (2013.01); *H01M 8/22* (2013.01); *H02J 3/28* (2013.01)

(58) Field of Classification Search
CPC ........... H02J 3/28; H01M 8/0631; H01M 8/22
See application file for complete search history.

(56) References Cited

U.S. PATENT DOCUMENTS

| 10,374,433 B2 | 8/2019 | Ito |
| 2005/0165511 A1 | 7/2005 | Fairlie |

(Continued)

FOREIGN PATENT DOCUMENTS

| CN | 112349938 A | * | 2/2021 |
| CN | 112510233 A | * | 3/2021 |

(Continued)

OTHER PUBLICATIONS

Machine translation of the PCT written opinion (no date).*

*Primary Examiner* — Amanda C. Walke
(74) *Attorney, Agent, or Firm* — Finnegan, Henderson, Farabow, Garrett & Dunner, LLP

(57) ABSTRACT

A controller according to an embodiment controls a hydrogen system including at least a hydrogen production system in which received power is planned in advance and a hydrogen production amount changes in accordance with the received power. The controller includes: a processor that calculates, in a preparation time period before a demand adjustment time period in which a target value of the received power is set in advance, a control command value such that input power to be inputted as the received power to the hydrogen production system matches the target value at a start of the demand adjustment time period; and a command controller that outputs the control command value calculated by the processor to the hydrogen production system.

10 Claims, 10 Drawing Sheets

(51) Int. Cl.
*H01M 8/22* (2006.01)
*H02J 3/28* (2006.01)

(56) References Cited

U.S. PATENT DOCUMENTS

| | | |
|---|---|---|
| 2006/0210851 A1 | 9/2006 | Komachiya et al. |
| 2017/0207629 A1 | 7/2017 | Seki et al. |
| 2020/0091524 A1* | 3/2020 | Umayahara ....... H01M 8/04201 |

FOREIGN PATENT DOCUMENTS

| | | | |
|---|---|---|---|
| CN | 113113646 A * | 7/2021 | ........ H01M 8/04104 |
| JP | 2003-61251 A | 2/2003 | |
| JP | 2004-362857 A | 12/2004 | |
| JP | 2007-523580 A | 8/2007 | |
| JP | 2016-111871 A | 6/2016 | |
| JP | 2016-140161 A | 8/2016 | |
| JP | 6096735 B2 | 3/2017 | |
| WO | WO 2018/078875 A1 | 5/2018 | |

* cited by examiner

CONTROLLER, CONTROLLING METHOD, AND RECORD MEDIUM

CROSS-REFERENCE TO RELATED APPLICATIONS

This application is based upon and claims the benefit of priority from PCT Application No. PCT/JP2018/045680, filed on Dec. 12, 2018; the entire contents of which are incorporated herein by reference.

FIELD

Embodiments of the present invention relate to a controller, a controlling method, and a record medium.

BACKGROUND

Hydrogen systems that produce and store hydrogen by electric power supply are known. For such a hydrogen system, a demand adjustment time period is set, in which the electric power demand is adjusted, for example by demand response. In the demand adjustment time period, input power to a hydrogen production system needs to be adjusted to a target value.

Accordingly, a controller that controls the input power to the hydrogen production system has been proposed. According to the controller, energy can be appropriately supplied from the hydrogen system to a load.

Since the hydrogen production system produces hydrogen by a method such as water electrolysis, a change rate in changing the hydrogen production amount is small. Therefore, when the demand adjustment time period is short, the hydrogen production amount may not change as planned within the demand adjustment time period even though the controller controls the input power to the hydrogen production system.

DETAILED DESCRIPTION

Embodiments will now be explained with reference to the accompanying drawings. The present invention is not limited to the embodiments.

A controller according to an embodiment controls a hydrogen system including at least a hydrogen production system in which received power is planned in advance and a hydrogen production amount changes in accordance with the received power. The controller includes: a processor that calculates, in a preparation time period before a demand adjustment time period in which a target value of the received power is set in advance, a control command value such that input power to be inputted as the received power to the hydrogen production system matches the target value at a start of the demand adjustment time period; and a command controller that outputs the control command value calculated by the processor to the hydrogen production system.

First Embodiment

Figure 1:
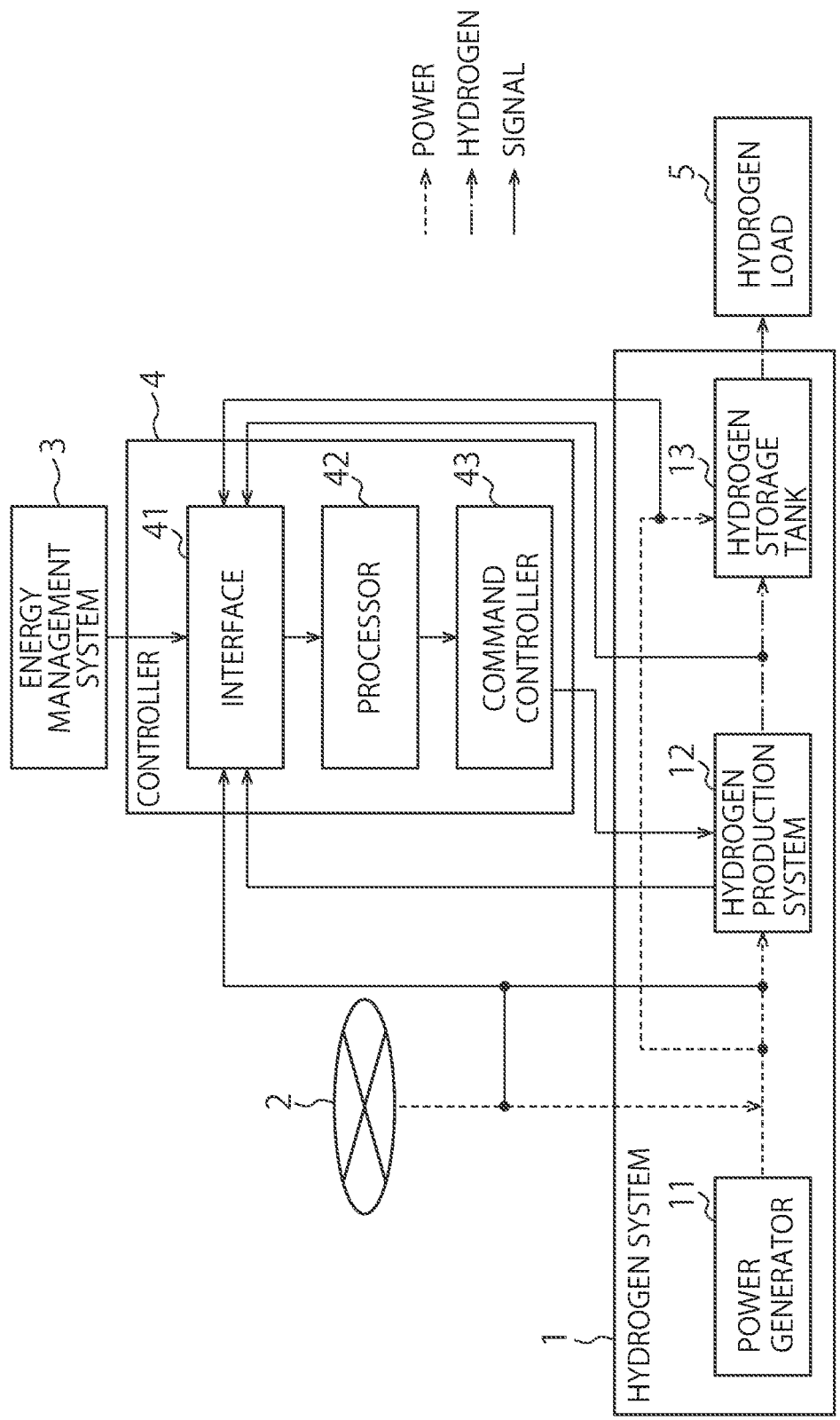
FIG. 1 is a block diagram showing an exemplary configuration of a hydrogen production management system according to a first embodiment.

FIG. 1 is a block diagram showing an exemplary configuration of a hydrogen production management system according to a first embodiment. The hydrogen production management system shown in FIG. 1 includes a hydrogen system 1, an electric power grid 2, an energy management system 3, a controller 4, and a hydrogen load 5.

The hydrogen system 1 includes a power generator 11, a hydrogen production system 12, and a hydrogen storage tank 13. In the present embodiment, the power generator 11 generates electric power with renewable energy. For example, a photovoltaic power generating (photovoltaics) device or a wind power generator can be applied to the power generator 11. The electric power generated by the power generator 11 is supplied to the hydrogen production system 12.

The hydrogen production system 12 receives the electric power supplied from the power generator 11 and the electric power supplied from the electric power grid 2 to produce hydrogen. The electric power grid 2 is a power transmission and distribution network managed by an electric power company. Additionally, the hydrogen production system 12 stores the produced hydrogen in the hydrogen storage tank 13.

The hydrogen storage tank 13 supplies the stored hydrogen to the hydrogen load 5. The hydrogen load 5 is a fuel cell power generator, or a hydrogen supplying device for fuel cell powered vehicles or the like.

The energy management system 3 creates an operation plan for the hydrogen system 1. The controller 4 controls the hydrogen system 1 based on the operation plan created by the energy management system 3.

The controller 4 includes an interface 41, a processor 42, and a command controller 43. The interface 41 receives various signals from the hydrogen system 1 and the energy management system 3. The processor 42 calculates a control command value, specifically an indicated value of input power to the hydrogen production system 12, based on the signal received by the interface 41. The command controller 43 controls the hydrogen production system 12 based on the control command value calculated by the processor 42.

Figure 2:
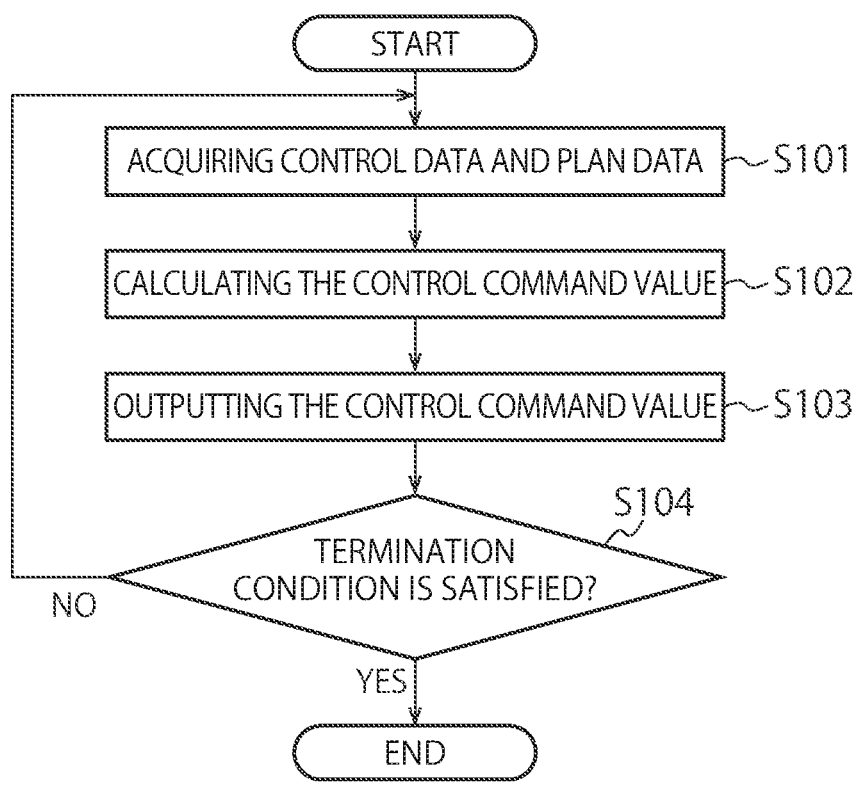
FIG. 2 is a flowchart showing a procedure of a controller according to the first embodiment.

FIG. 2 is a flowchart showing a procedure of the controller 4 according to the first embodiment. The operation of the controller 4 is described with reference to FIG. 2.

Firstly, the interface 41 receives a signal indicating control data from the hydrogen system 1 and a signal indicating plan data related to an operation plan for the hydrogen system 1 from the energy management system 3 (step S101). In step S101, the interface 41 sends these received signals to the processor 42.

In the present embodiment, the control data includes received power from the electric power grid 2, PV generated power generated by the power generator 11, input power to the hydrogen production system 12, a hydrogen production amount actually produced by the hydrogen production system 12, and power consumption of the hydrogen storage tank 13. The plan data includes respective planned values of the hydrogen production amount and the power consumption of the hydrogen production system 12, a predicted value of the PV power generation in the power generator 11, and a demand adjustment time period in which the electric power demand is adjusted.

Figure 3:
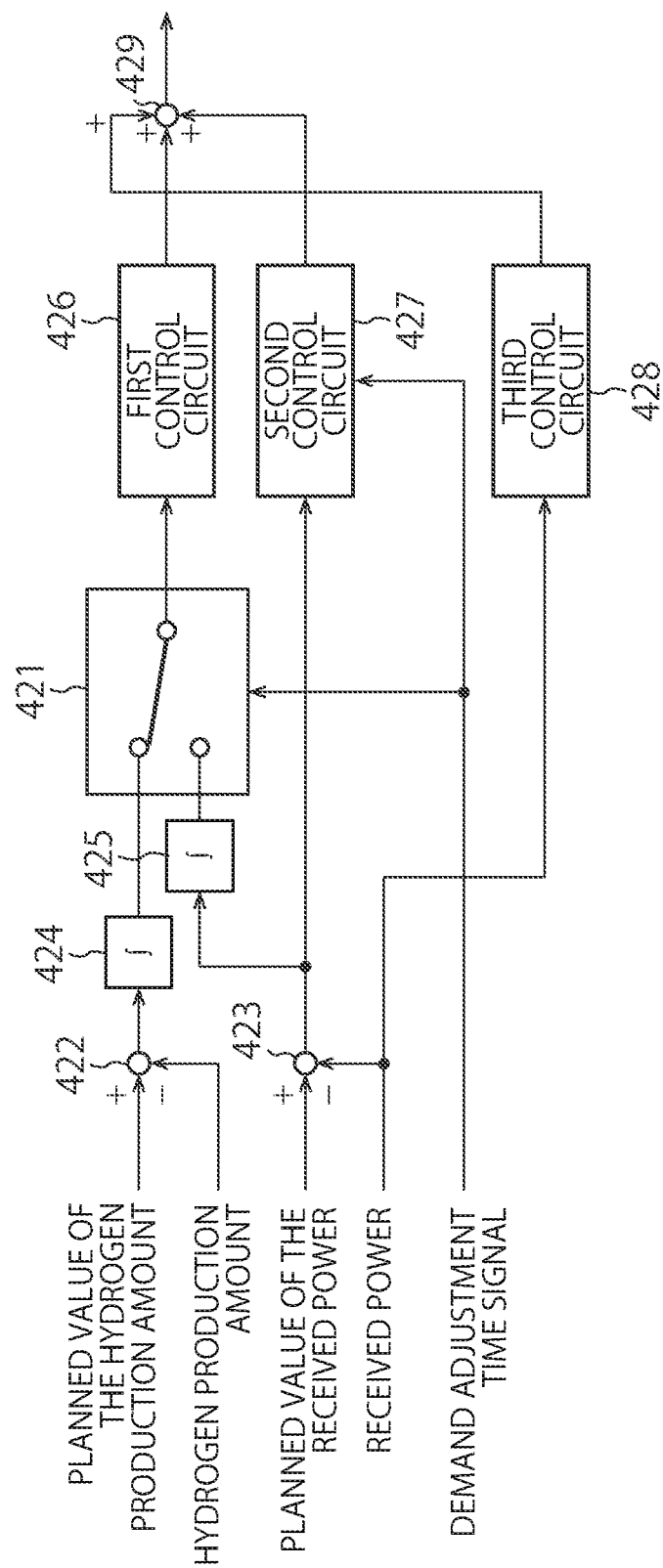
FIG. 3 is a block diagram showing a configuration of a processor according to the first embodiment.

Next, the processor 42 calculates a control command value based on the signal received from the interface 41 (step S102). The method of calculating the control command value differs depending on the time period. With reference to FIG. 3, a configuration of the processor 42 is now described, and step S102 is also described in detail.

FIG. 3 is a block diagram showing a configuration of the processor 42 according to the first embodiment. The processor 42 shown in FIG. 3 includes a switch 421, subtractors 422, 423, integrating circuits 424, 425, a first control circuit 426, a second control circuit 427, a third control circuit 428, and an adder 429.

In the processor 42, the switch 421 changes the calculation process in response to a demand adjustment time signal indicating whether the concerned time is in the demand adjustment time period. In other words, the process content of the processor 42 differs depending on whether the concerned time is in the demand adjustment time period.

When the demand adjustment time signal indicates that the concerned time is in a non-demand adjustment time period, which is out of the demand adjustment time period, the switch 421 connects the subtractor 422 and the integrating circuit 424 to the first control circuit 426. The subtractor 422 thereby calculates a difference between a planned value of the hydrogen production amount acquired from the energy management system 3 and a hydrogen production amount of the hydrogen production system 12 acquired from the hydrogen system 1. The integrating circuit 424 then integrates the differences calculated by the subtractor 422. Subsequently, the first control circuit 426 performs, for example, PI (Proportional Integral) control so as to reduce the integrated difference to zero. As a result, an indicated value of input power corresponding to the planned value of the hydrogen production amount is calculated as a control command value.

On the other hand, when the demand adjustment time signal indicates that the concerned time is in the demand adjustment time period, the switch 421 connects the subtractor 423 and the integrating circuit 425 to the first control circuit 426. The subtractor 423 thereby calculates a difference between a planned value of the received power acquired from the energy management system 3 and received power acquired from the hydrogen system 1. The integrating circuit 425 then integrates the differences calculated by the subtractor 423. Subsequently, the first control circuit 426 performs, for example, PI control so as to reduce the integrated difference to zero. As a result, an indicated value of input power corresponding to the planned value of the received power is calculated as a control command value.

In the present embodiment, the demand adjustment time period is predetermined every 30 minutes by the energy management system 3, and thus the processor 42 can know in advance a preparation time period, which is a time period before the demand adjustment time period, based on the demand adjustment time signal. When the control start time described later is reached within the preparation time period, the switch 421 connects the subtractor 423 and the integrating circuit 425 to the first control circuit 426, and the second control circuit 427 is driven.

The second control circuit 427 performs feedforward control based on the difference calculated by the subtractor 423 so that at the start of the demand adjustment time period, the input power to be inputted to the hydrogen production system 12 as the received power matches a target value, which is the planned value of the received power in the demand adjustment time period. The adder 429 totals up the output value of the second control circuit 427 and the output value of the first control circuit 426. Subsequently, the total value obtained by the adder 429 is calculated as a control command value.

The third control circuit 428 is a circuit for preventing reverse power flow in which the electric power generated by the power generator 11 flows to the electric power grid 2. The third control circuit 428 compares the received power of the hydrogen production system 12 with a threshold value regardless of the time period. When the received power becomes smaller than the threshold value, the output value of the third control circuit 428 increases. The output value of the third control circuit 428 is increased by the adder 429, and thereby a control command value for increasing the input power to the hydrogen production system 12 is calculated. Since the increased input power to the hydrogen production system 12 leads to increased consumption of the output power from the power generator 11 in the hydrogen production system 12, the reverse power flow can be prevented.

The control as performed by the processor 42 in the demand adjustment time period may be performed not only in the demand adjustment time period but also in a baseline calculation time period in which the target value in the demand adjustment time period is set. The baseline calculation time period is set by the energy management system 3, for example, in the same time period as the demand adjustment time period one day or one week preceding the day of performing the demand adjustment. When the baseline calculation time period is reached, the switch 421 connects the subtractor 423 and the integrating circuit 425 to the first control circuit 426. Subsequently, a control command value is calculated so that the received power matches the planned value.

The control command value calculated in step S102 described above is outputted to the hydrogen production system 12 by the command controller 43 (step S103). The hydrogen production system 12 produces hydrogen based on the control command value from the command controller 43. Subsequently, the controller 4 repeats the operations of steps S101 to S103 described above until a predetermined termination condition is satisfied (step S104). The termination condition for the operation of the controller 4 has been set by, for example, the energy management system 3.

Figure 4A:
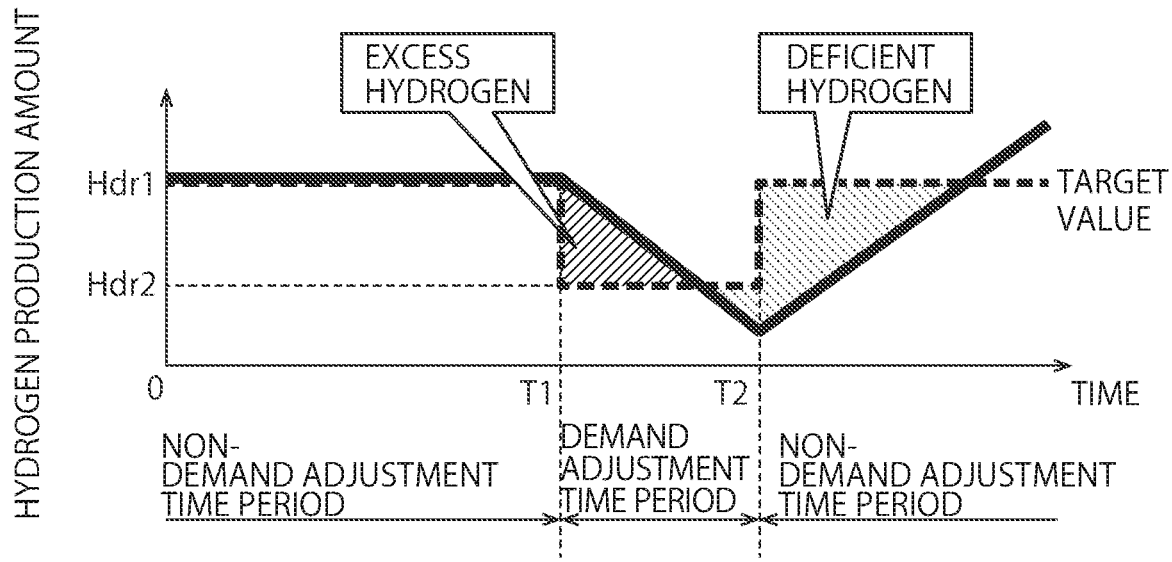
FIG. 4A is a diagram showing an example of a change over time in hydrogen production amount according to a comparative example.
Figure 4B:
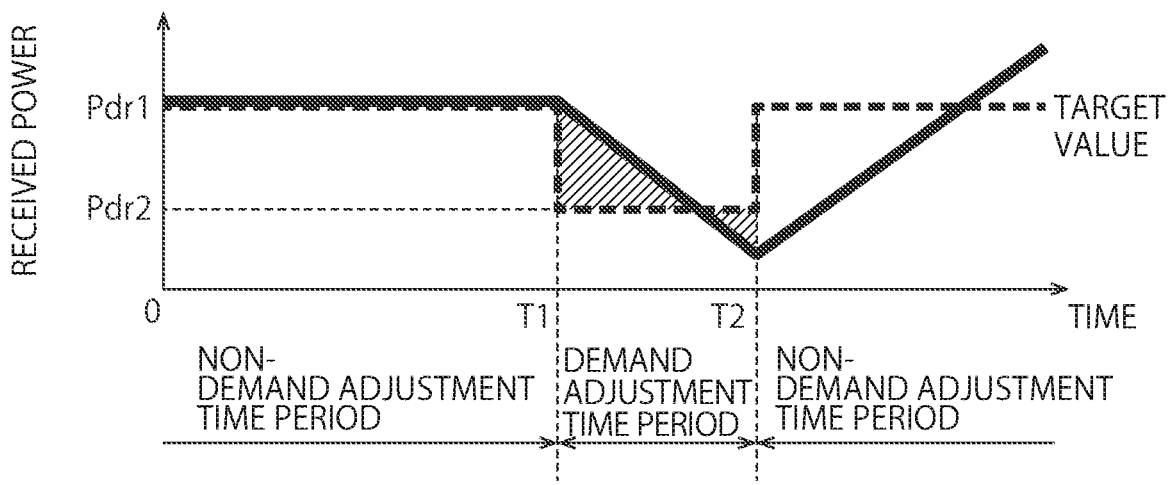
FIG. 4B is a diagram showing an example of a change over time in received power according to the comparative example.

Points of difference between the present embodiment and a comparative example in the controlling method of demand adjustment is described below. FIG. 4A is a diagram showing an example of a change over time in hydrogen production amount according to the comparative example. FIG. 4B is a diagram showing an example of a change over time in received power according to the comparative example.

As shown in FIGS. 4A and 4B, in the non-demand adjustment time period, the control is performed such that the actual hydrogen production amount matches the planned value "Hdr1" and the received power, that is the input power, matches the planned value "Pdr1". On the other hand, in the demand adjustment time period, the control is performed such that the actual hydrogen production amount matches the target value "Hdr2" and the received power matches the target value "Pdr2".

However, as shown in FIG. 4B, in the comparative example, at the start time "T1" of the demand adjustment time period, the control is started such that the received power decreases from the planned value "Pdr1" to the target value "Pdr2". In this case, as shown in FIG. 4A, the hydrogen production amount decreases in accordance with the change rate of the received power. Therefore, in the demand adjustment time period, the actual hydrogen production amount exceeds the target value "Hdr2", which results in a state of excess hydrogen.

As shown in FIG. 4A, past the termination time "T2" of the demand adjustment time period, the time period shifts from the demand adjustment time period to the non-demand adjustment time period, and the control is started such that the hydrogen production amount matches the planned value "Hdr1". Immediately after the time period shifts from the demand adjustment time period to the non-demand adjustment time period, a state of deficient hydrogen, in which the hydrogen production amount is less than the target value "Hdr2", occurs. Therefore, the control is performed such that the error between the hydrogen production amount and the target value "Hdr2" decreases. As a result, a value of overshoot, in which the hydrogen production amount exceeds the target value "Hdr2", may become large, and the control performance may deteriorate.

Figure 5A:
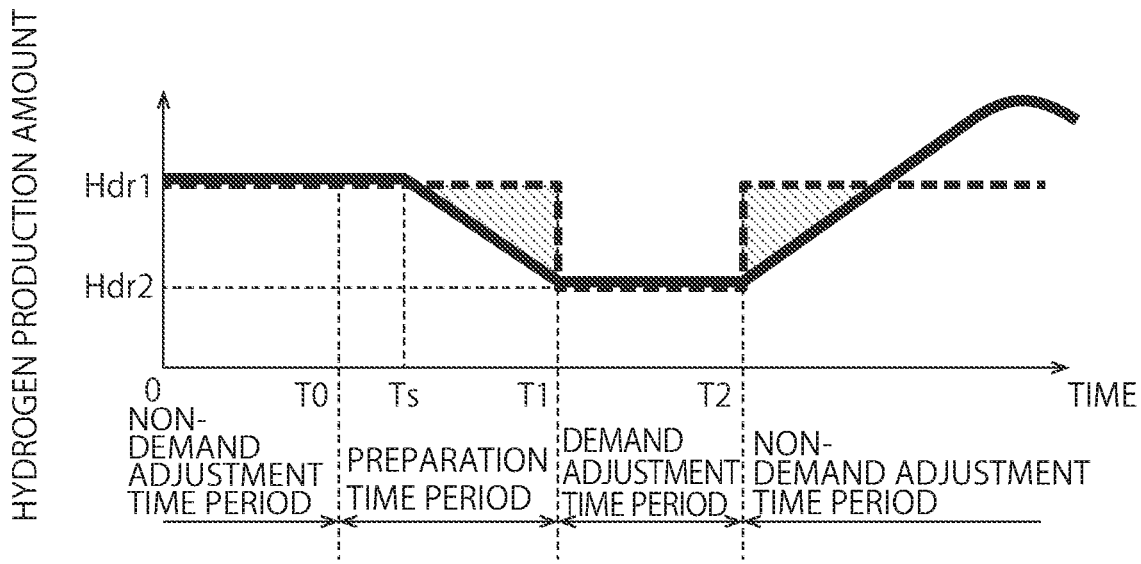
FIG. 5A is a diagram showing an example of a change over time in hydrogen production amount according to the first embodiment.
Figure 5B:
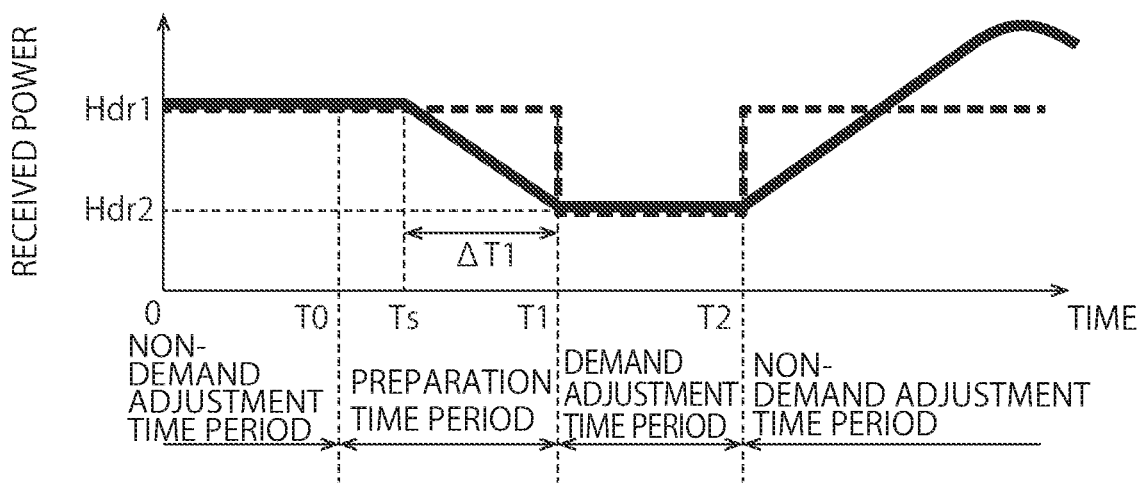
FIG. 5B is a diagram showing an example of a change over time in received power according to the first embodiment.

On the contrary, FIG. 5A is a diagram showing an example of a change over time in hydrogen production amount according to the present embodiment. FIG. 5B is a diagram showing an example of a change over time in received power according to the present embodiment.

As shown in FIG. 5B, in the present embodiment, when the control start time "Ts" is reached in the preparation time period, the second control circuit 427 starts feedforward control such that the received power of the hydrogen production system 12 matches the target value.

The control start time "Ts" is calculated by following equations (1) and (2) using received power "P" (kW) at the start time "T0" of the preparation time period, the target value "Pdr2" (kW) of the received power in the demand adjustment time period, and a maximum change rate "R" (kW/min) of the input power to the hydrogen production system 12. In the following equation (2), the planned value "Pdr1" for the non-demand adjustment time period may be used instead of the received power "P".

$$Ts = T1 - \Delta T1 \quad (1)$$

$$\Delta T1 = (P - Pdr2)/R \quad (2)$$

When the control start time "Ts" is reached, the switch 421 is switched, and through the feedback control by the first control circuit 426 and the feedforward control by the second control circuit 427, the received power decreases in accordance with the change rate of the output of the hydrogen production system 12. As a result, at the start time "T1" of the demand adjustment time period, the received power matches the target value "Pdr2".

In the demand adjustment time period, the control command value is calculated so that a state of the received power matching the target value "Pdr2" is maintained through the feedback control by the first control circuit 426.

Subsequently, past the termination time "T2" of the demand adjustment time period, the control is switched so that the hydrogen production amount matches the planned value "Hdr1". Immediately after the time period shifts from the demand adjustment time period to the non-demand adjustment time period, a state of deficient hydrogen, in which the hydrogen production amount is less than the target value "Hdr2", occurs. Therefore, the control is performed such that the error between the hydrogen production amount and the target value "Hdr2" decreases. In the present embodiment, since the hydrogen production amount in the demand adjustment time period matches the target value "Hdr2", the error between the hydrogen production amount and the target value "Hdr2" is smaller than that in the comparative example described above. Therefore, the value of overshoot is also smaller, and the control performance can be improved.

According to the present embodiment described above, the received power is adjusted in advance in the preparation time period before the demand adjustment time period. As a result, the received power matches the target value at the start time of the demand adjustment time period. Therefore, the demand can be reliably adjusted regardless of the response speed to the input power to the hydrogen production system 12.

When the demand adjustment time period terminates, the control is performed such that the hydrogen production amount matches the planned value, and thereby hydrogen can be reliably supplied to the hydrogen load.

Further, when the received power becomes smaller than the threshold value, the control is performed to increase the input power to the hydrogen production system 12. As a result, the electric power generated by the power generator 11 can be effectively used without the reverse power flow.

(Modification)

A modification is described below. The present modification is different from the first embodiment in the controlling method of the received power in the preparation time period.

Figure 6A:
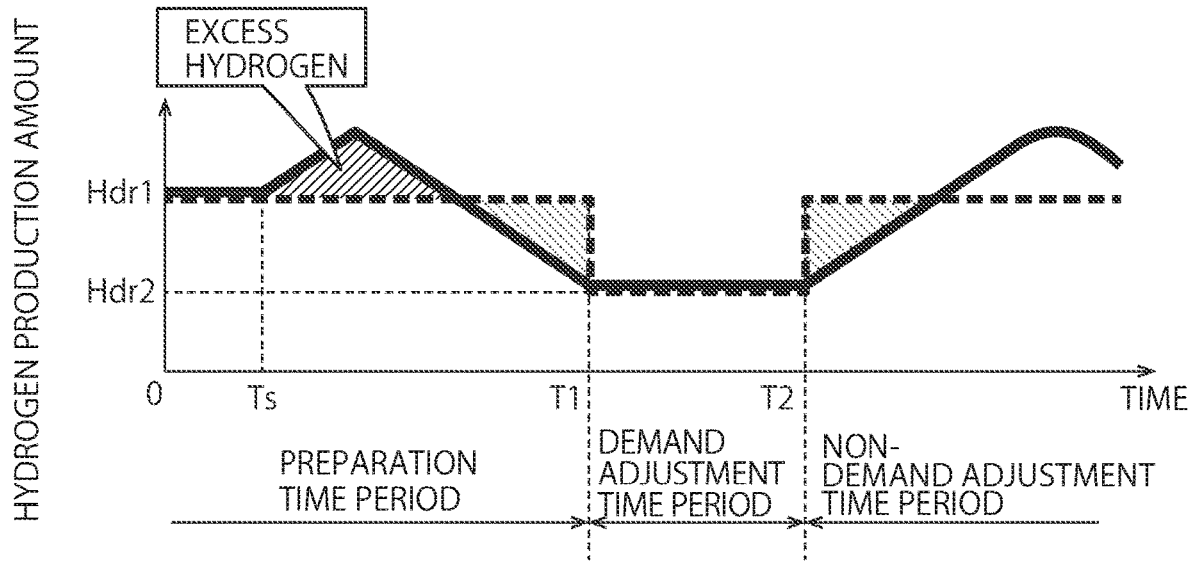
FIG. 6A is a diagram showing an example of a change over time in hydrogen production amount according to a modification.
Figure 6B:
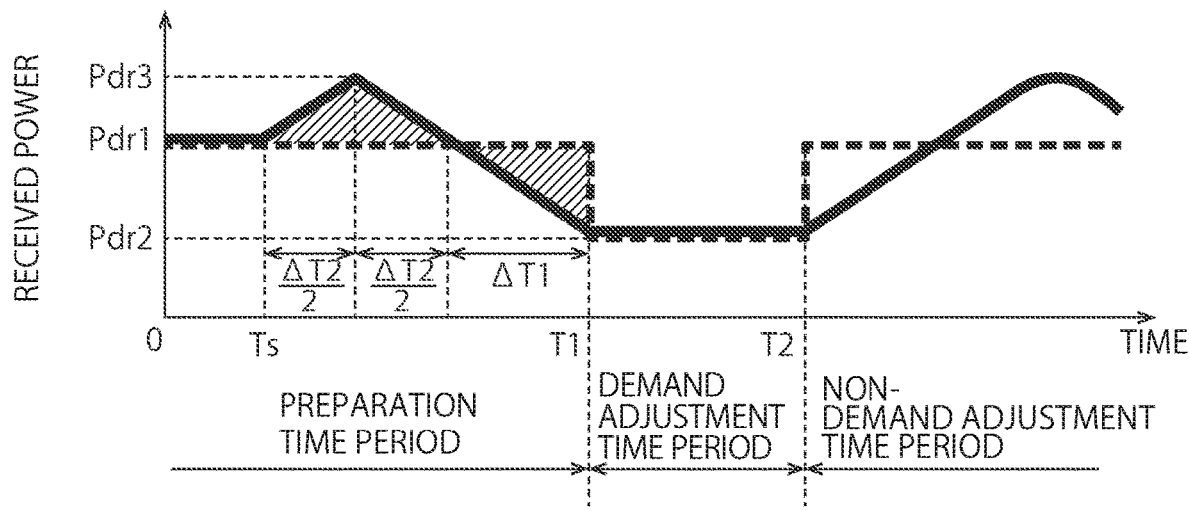
FIG. 6B is a diagram showing an example of a change over time in received power according to the modification.

FIG. 6A is a diagram showing an example of a change over time in hydrogen production amount according to the modification. FIG. 6B is a diagram showing an example of a change over time in received power according to the modification.

In the first embodiment described above, since the received power is decreased from the control start time "Ts" to the start time "T1" of the demand adjustment time period, the hydrogen production amount becomes smaller than the planned value "Hdr1". Therefore, the hydrogen stored in the hydrogen storage tank 13 may be deficient.

Accordingly, in the present modification, the controller 4 performs control to make up a deficiency of hydrogen in the preparation time period. In this control, the control start time "Ts" is calculated by the following equations (3) and (4) so as to generate an excessive amount of hydrogen equal to a deficient amount of hydrogen.

$$Ts = T1 - \Delta T1 - \Delta T2 \quad (3)$$

$$\Delta T2 = \sqrt{2} \Delta T1 \quad (4)$$

In the time period from the control start time "Ts" to the elapse of "ΔT2"/2, the command controller 43 increases the received power to the target value "Pdr3" at the maximum change rate of the input power. The command controller 43 then decreases the received power to the target value "Pdr2" at the maximum change rate of the input power until the start time "T1" of the demand adjustment time period is reached. From the demand adjustment time period, the same control as that in the first embodiment is performed.

According to the present modification described above, the received power of the hydrogen production system 12 is adjusted in the preparation time period so that the received power matches the target value at the start time of the demand adjustment time period, as in the first embodiment. Therefore, the demand in the hydrogen production system 12 can be reliably adjusted.

Additionally, in the present modification, hydrogen is excessively produced in the preparation time period. Therefore, the deficiency of hydrogen that may occur in the preparation time period can be eliminated.

Second Embodiment

A controller according to a second embodiment is described with reference to FIGS. 7 and 8. The same components as those in the first embodiment are denoted by the same symbols, and redundant description is omitted.

Figure 7:
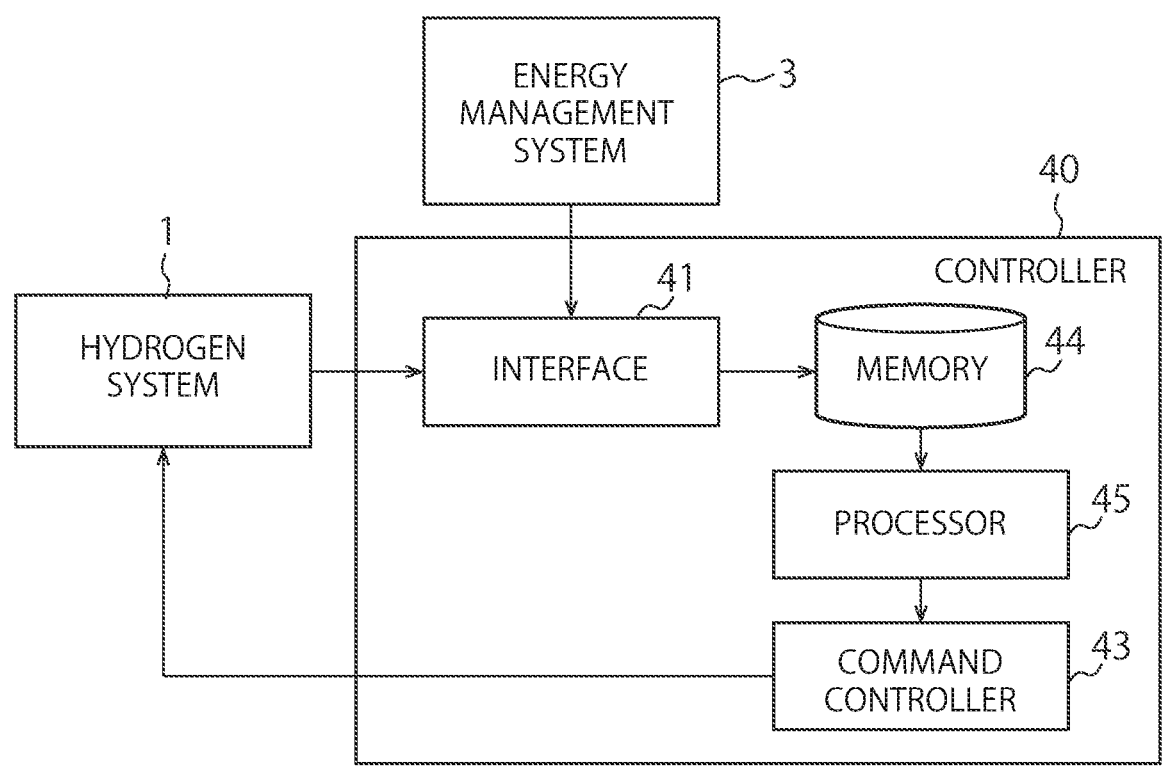
FIG. 7 is a block diagram showing an exemplary configuration of a controller according to a second embodiment.

FIG. 7 is a block diagram showing an exemplary configuration of a controller 40 according to the second embodiment. The controller 40 includes a memory 44 in addition to the components of the controller 4 in the first embodiment. The controller 40 includes a processor 45 instead of the processor 42 in the first embodiment.

The memory 44 stores various data, such as data received by the interface 41, a model representing a correlation between the received power and the hydrogen production amount in the hydrogen production system 12, and performance data on the hydrogen production amount actually produced by the hydrogen production system 12. The memory 44 is composed of a storage device such as a semiconductor memory. The processor 45 calculates a control command value based on the signal and the model stored in the memory 44.

Figure 8:
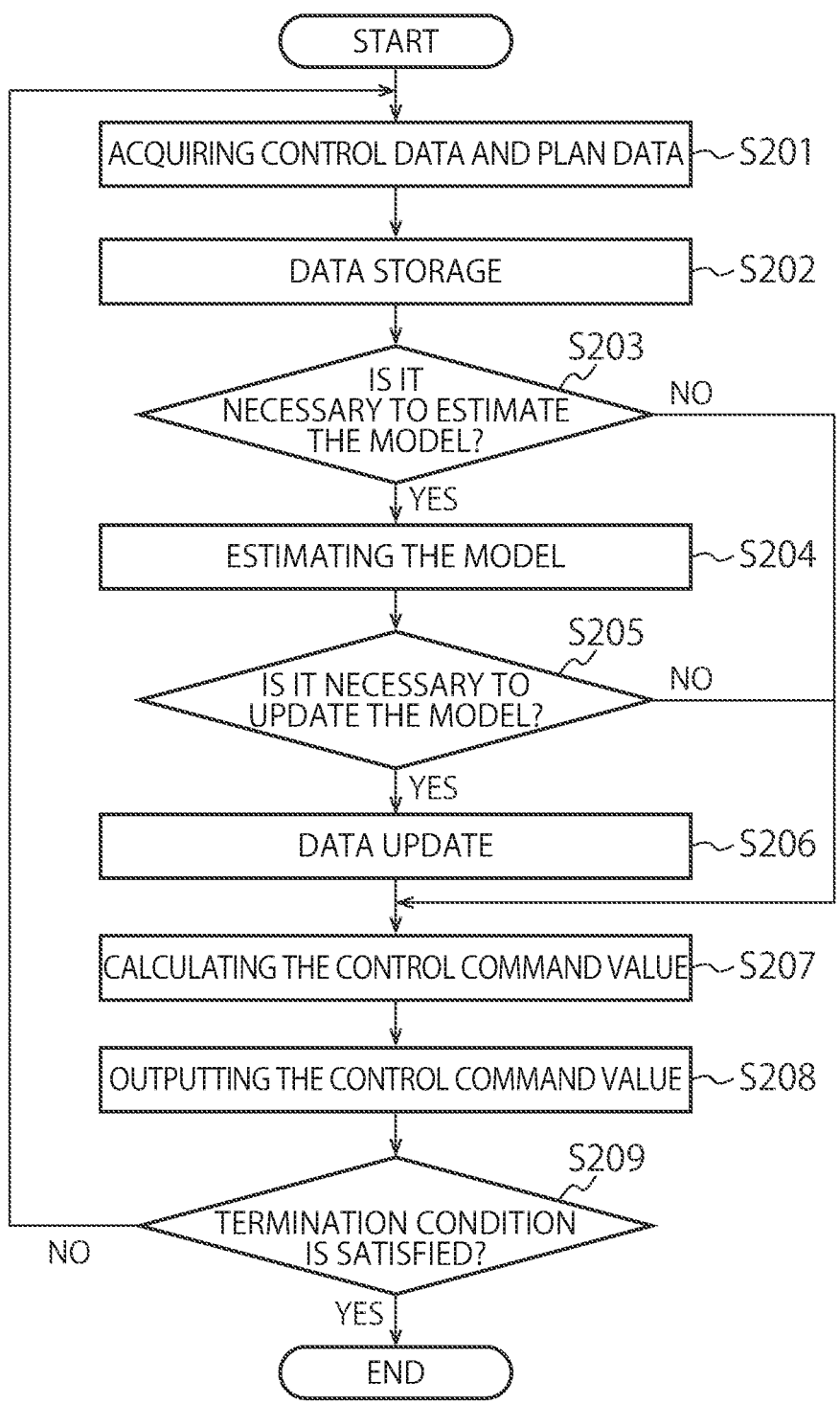
FIG. 8 is a flowchart showing a procedure of the controller according to the second embodiment.

FIG. 8 is a flowchart showing a procedure of the controller 40 according to the second embodiment. The operation of the controller 40 is described with reference to FIG. 8.

Firstly, as in the first embodiment, the interface 41 receives a signal indicating control data related to control from the hydrogen system 1 and a signal indicating plan data related to an operation plan for the hydrogen system 1 from the energy management system 3 (step S201). The data received by the interface 41 is stored in the memory 44 (step S202).

Next, the processor 45 determines whether it is necessary to estimate the model stored in the memory 44 (step S203). As described above, the model represents a correlation between the received power and the hydrogen production amount in the hydrogen production system 12. This correlation may change due to aged deterioration or replacement of the hydrogen production system 12.

Accordingly, in the present embodiment, for example, when the operation time of the hydrogen production system 12 exceeds a reference value, the processor 45 estimates the model using the performance data on the hydrogen production system 12 stored in the memory 44 (step S204).

The processor 45 then determines whether the estimated model needs to be updated (step S205). In the present embodiment, for example, when the difference between the estimated model and the performance data is out of a permissible range, the processor 45 updates the stored model in the memory 44 (step S206).

Next, as in the first embodiment, the processor 45 calculates a control command value in each of the non-demand adjustment time period, the preparation time period, and the demand adjustment time period (step S207). The calculated control command values are outputted to the hydrogen production system 12 by the command controller 43 (step S208). Subsequently, the controller 40 repeats the operations of steps S201 to S208 described above until a predetermined termination condition is satisfied (step S209).

According to the present embodiment described above, the received power is adjusted using the data stored in the memory 44 in the preparation time period so that the received power matches the target value at the start time of the demand adjustment time period. Therefore, the demand can be reliably adjusted regardless of the response speed to the input power to the hydrogen production system 12.

Further, in the present embodiment, the model used for the adjustment of the received power is estimated and updated based on the performance data. As a result, accurate control can be provided against replacement or aged deterioration of the hydrogen production system 12.

Third Embodiment

A controller according to a third embodiment is described with reference to FIGS. 9 to 11. The same components as those in the first embodiment are denoted by the same symbols, and redundant description is omitted.

Figure 9:
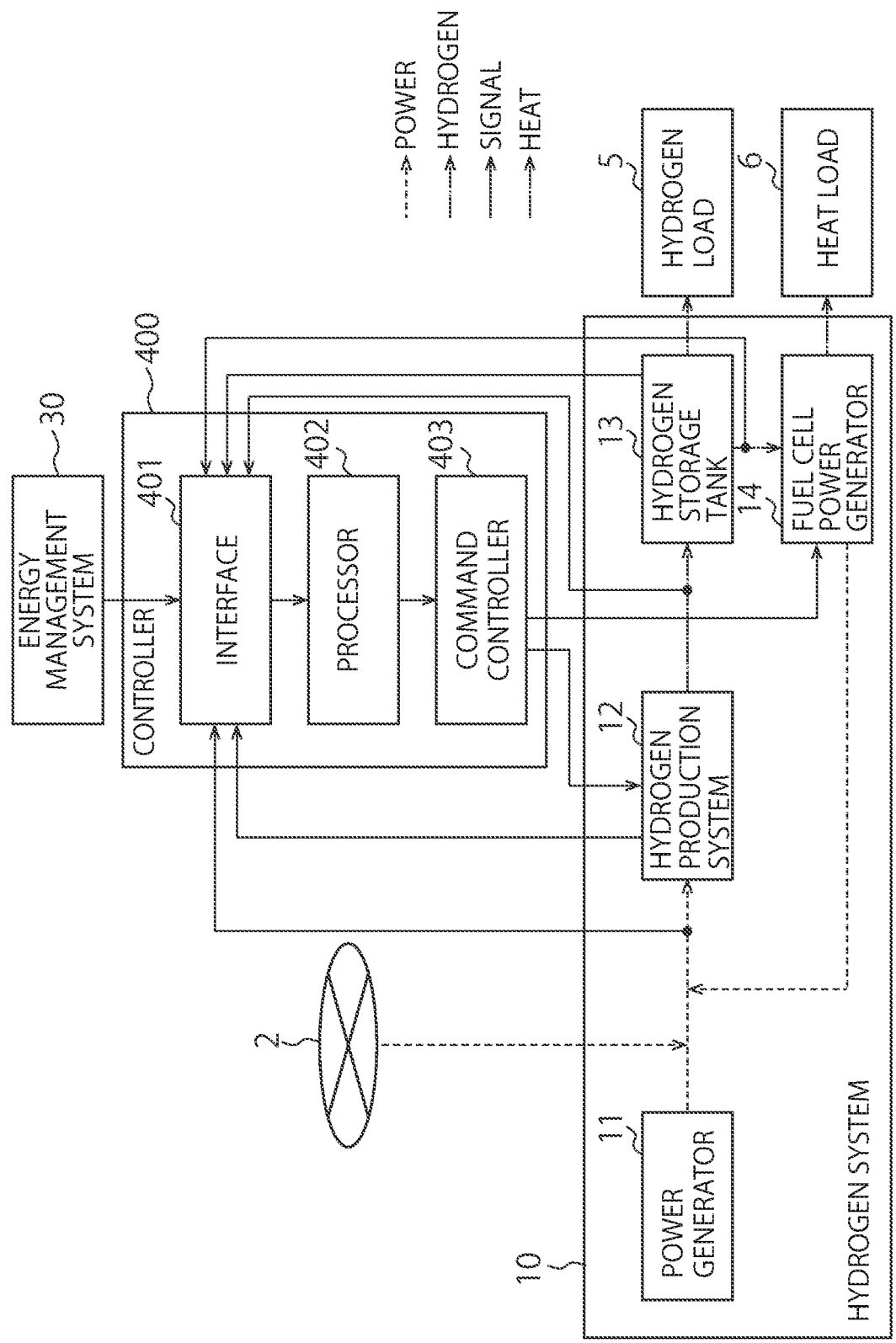
FIG. 9 is a block diagram showing an exemplary configuration of a hydrogen production management system according to a third embodiment.

FIG. 9 is a block diagram showing an exemplary configuration of a hydrogen production management system according to the third embodiment. The hydrogen production management system shown in FIG. 9 includes a hydrogen system 10, the electric power grid 2, an energy management system 30, a controller 400, the hydrogen load 5, and a heat load 6.

The hydrogen system 10 includes a fuel cell power generator 14 in addition to the configuration of the hydrogen system 1 according to the first embodiment (see FIG. 1). The fuel cell power generator 14 generates electric power and heat from the hydrogen stored in the hydrogen storage tank 13. The electric power is supplied to the hydrogen production system 12 together with the electric power generated by the power generator 11 and the electric power from the electric power grid 2, and is used to produce hydrogen. The heat generated by the fuel cell power generator 14 is supplied to the heat load 6. The heat load 6 is a hot-water supplying load or a thermal load.

The energy management system 30 creates an operation plan for the hydrogen system 10. The controller 400 controls the hydrogen system 10 based on the operation plan created by the energy management system 30.

The controller 400 includes an interface 401, a processor 402, and a command controller 403 that replaces the command controller 43, as shown in FIG. 9. The interface 401 receives signals from the hydrogen system 10 and the energy management system 30.

The processor 402 calculates control command values for the hydrogen production system 12 and the fuel cell power generator 14 respectively based on the signals. The control command value for the hydrogen production system 12 indicates an indicated value of input power. The control command value for the fuel cell power generator 14 indicates an indicated value of power generation. The command controller 403 controls the hydrogen production system 12 and the fuel cell power generator 14 individually based on the control command values calculated by the processor 402.

The operation of the controller 400 is described below. The controller 400 operates in accordance with a flowchart similar to that for the controller 4 according to the first embodiment (see FIG. 2). Here, points of difference from the first embodiment are mainly described.

In step S101 of the present embodiment, the control data provided from the hydrogen system 10 to the interface 401 includes an actual power generation of the fuel cell power generator 14 and a fuel consumption of the fuel cell power generator 14 in addition to the data in the first embodiment described above. The plan data provided from the energy management system 30 to the interface 401 includes a planned value of the power generation of the fuel cell power generator 14 in addition to the data in the first embodiment described above.

In step S102, the processor 402 calculates control command values for the hydrogen production system 12 and the fuel cell power generator 14 respectively based on the signals received from the interface 401. Step S102 of the present embodiment is now described in detail with reference to FIG. 10 with an explanation of a configuration of the processor 402.

Figure 10:
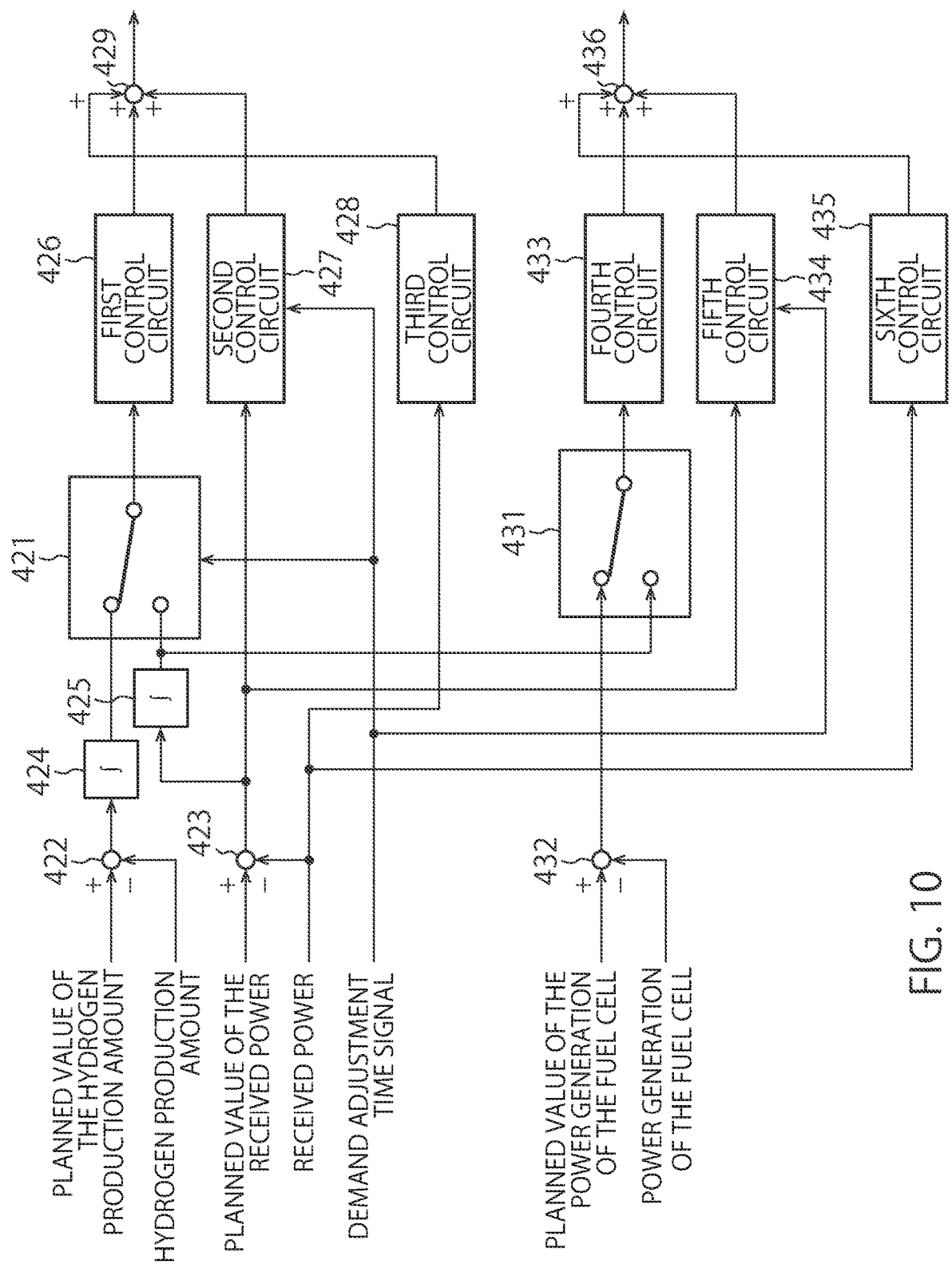
FIG. 10 is a block diagram showing a configuration of a processor according to the third embodiment.

FIG. 10 is a block diagram showing a configuration of the processor 402 according to the third embodiment. The processor 402 shown in FIG. 10 includes a switch 431, a subtractor 432, a fourth controlling circuit 433, a fifth controlling circuit 434, a sixth controlling circuit 435, and an adder 436 in addition to the configuration of the processor 42 according to the first embodiment (see FIG. 3).

In the non-demand adjustment time period, the preparation time period, and the demand adjustment time period, the control operation for the hydrogen production system 12 by the processor 402 is similar to that in the first embodiment, and thus the description thereof is omitted. Here, the operation in which the processor 402 controls the power generation of the fuel cell power generator 14 is described.

In the non-demand adjustment time period, the switch 431 connects the subtractor 432 to the fourth controlling circuit 433 as shown in FIG. 10. The subtractor 432 thereby calculates a difference between a planned value of the power generation of the fuel cell power generator 14 and a power generation of the fuel cell power generator 14 acquired from the hydrogen system 10. Subsequently, the fourth controlling circuit 433 performs feedback control so as to reduce the difference to zero.

In the demand adjustment time period, the switch 431 connects the integrating circuit 425 to the fourth controlling circuit 433. The fourth controlling circuit 433 performs feedback control of the power generation of the fuel cell power generator 14 such that the received power of the hydrogen production system 12 matches the planned value.

In the preparation time period, the fifth controlling circuit 434 performs feedforward control of the power generation of the fuel cell such that the received power matches the planned value at the start time of demand adjustment.

Additionally, the sixth controlling circuit 435 compares the received power with a threshold value regardless of the time period. When the received power becomes smaller than the threshold value, the output value of the sixth controlling circuit 435 increases. The output value of the sixth controlling circuit 435 is added by the adder 436, and a control command value for decreasing the power generation of the fuel cell power generator 14 is calculated. As a result, the electric power supply from the fuel cell power generator 14 to the hydrogen production system 12 decreases, while the electric power supply from the power generator 11 to the hydrogen production system 12 increases. Therefore, the reverse power flow can be prevented.

According to the present embodiment described above, the received power of the hydrogen production system 12 is adjusted in advance in the preparation time period so that the received power matches the target value at the start time of the demand adjustment time period, as in the first embodiment. Therefore, the electric power demand can be reliably adjusted.

Additionally, in the present embodiment, the control range of the received power in the demand adjustment time period, for example in demand response, can be expanded by controlling also the power generation of the fuel cell power generator 14.

In the embodiments described above, at least a part of the process performed by the processor may be configured with software. For the configuration with software, a program that realizes a part of the process may be stored in a non-transitory recording medium such as a flexible disk, a magnetic disk, and an optical disk, and may be read by a computer for execution. The recording medium is not limited to a detachable recording medium such as a magnetic disk and an optical disk, and may be a stationary recording medium such as a solid state drive device, a hard disk device, and a memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A controller that controls a hydrogen system including at least a hydrogen production system in which received power is planned in advance and a hydrogen production amount changes in accordance with the received power, comprising:
    a processor that calculates, in a preparation time period before a demand adjustment time period in which a target value of the received power is set in advance, a control command value such that input power to be inputted as the received power to the hydrogen production system matches the target value at a start of the demand adjustment time period; and
    a command controller that outputs the control command value calculated by the processor to the hydrogen production system.

2. The controller according to claim 1, wherein the processor calculates:
    the control command value based on the input power in the demand adjustment time period; and
    the control command value based on the hydrogen production amount in a non-demand adjustment time period.

3. The controller according to claim 2, wherein the processor calculates the control command value based on the input power in a baseline calculation time period in which the target value is set.

4. The controller according to claim 1, further comprising a memory that stores a model representing a correlation between the received power and the hydrogen production amount,
wherein the processor calculates the control command value using the model in the preparation time period.

5. The controller according to claim 4, wherein the processor estimates the model from performance data that indicates the hydrogen production amount actually produced by the hydrogen production system, and calculates the control command value using the estimated model.

6. The controller according to claim 1, wherein
the hydrogen system comprises a power generator that supplies electric power to the hydrogen production system; and
the processor calculates the control command value using supply power from the power generator to the hydrogen production system as a part of the input power.

7. The controller according to claim 6, wherein when the received power is smaller than a threshold value, the processor increases the input power.

8. The controller according to claim 1, wherein
the hydrogen system comprises a hydrogen storage tank that stores hydrogen produced by the hydrogen production system, and a fuel cell power generator that generates electric power from the hydrogen stored in the hydrogen storage tank; and
the processor calculates a control command value such that a power production of the fuel cell power generator matches a planned value, in the preparation time period.

9. A controlling method of a hydrogen system including at least a hydrogen production system in which received power and a hydrogen production amount are planned in advance, comprising:
calculating, in a preparation time period before a demand adjustment time period in which a target value of the received power is set in advance, a control command value such that the received power matches the target value at a start of the demand adjustment time period; and
outputting the calculated control command value to the hydrogen production system.

10. A non-transitory record medium recording a program that makes a computer execute control of a hydrogen system including at least a hydrogen production system in which received power and a hydrogen production amount are planned in advance, the program comprising:
calculating, in a preparation time period before a demand adjustment time period in which a target value of the received power is set in advance, a control command value such that the received power matches the target value at a start of the demand adjustment time period; and
outputting the calculated control command value to the hydrogen production system.

* * * * *